(12) United States Patent
Zhou

(10) Patent No.: US 8,957,725 B2
(45) Date of Patent: Feb. 17, 2015

(54) ENERGY SAVING CIRCUIT OF COMPUTER

(71) Applicants: Hong Fu Jin Precision Industry (ShenZhen) Co., Ltd., Shenzhen (CN); Hon Hai Precision Industry Co., Ltd., New Taipei (TW)

(72) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/252,864

(22) Filed: Apr. 15, 2014

(65) Prior Publication Data

US 2014/0317426 A1    Oct. 23, 2014

(30) Foreign Application Priority Data

Apr. 18, 2013  (CN) .................. 2013 1 01349960

(51) Int. Cl.
*G05F 1/10*    (2006.01)
*G06F 1/32*    (2006.01)

(52) U.S. Cl.
CPC ........................................ *G06F 1/32* (2013.01)
USPC ............................. 327/541; 327/143; 713/324

(58) Field of Classification Search
USPC ................................ 327/143, 198, 541; 713/324
See application file for complete search history.

(56) References Cited

U.S. PATENT DOCUMENTS

| | | | | |
|---|---|---|---|---|
| 6,486,718 | B1* | 11/2002 | Stelle et al. | 327/198 |
| 7,400,188 | B2* | 7/2008 | Huang et al. | 327/543 |
| 7,639,063 | B2* | 12/2009 | Xiong | 327/398 |
| 7,679,224 | B2* | 3/2010 | Ren | 307/130 |
| 7,791,399 | B2* | 9/2010 | Zhou et al. | 327/340 |
| 7,805,623 | B2* | 9/2010 | Jia et al. | 713/300 |
| 7,826,190 | B2* | 11/2010 | Wu et al. | 361/91.1 |
| 7,830,044 | B2* | 11/2010 | Tai et al. | 307/154 |
| 8,073,158 | B2* | 12/2011 | Liu et al. | 381/94.5 |
| 8,255,718 | B2* | 8/2012 | Xi | 713/320 |
| 8,410,842 | B1* | 4/2013 | Bai et al. | 327/427 |
| 2007/0188202 | A1* | 8/2007 | Kuo | 327/142 |
| 2012/0306435 | A1* | 12/2012 | Tu et al. | 320/107 |

\* cited by examiner

*Primary Examiner* — Thomas J Hiltunen
(74) *Attorney, Agent, or Firm* — Novak Druce Connolly Bove + Quigg LLP

(57) ABSTRACT

Energy saving circuit of a computer is connected between a power supply and a motherboard. The energy saving circuit includes six electronic switches and a switch. When the computer is in the stand-by state, and the switch is pressed, the motherboard of the computer receives a standby voltage and the motherboard maintains the stand-by state. The energy-saving circuit can shut off the standby voltage by pressing the switch when the computer is powered off to save energy.

3 Claims, 1 Drawing Sheet

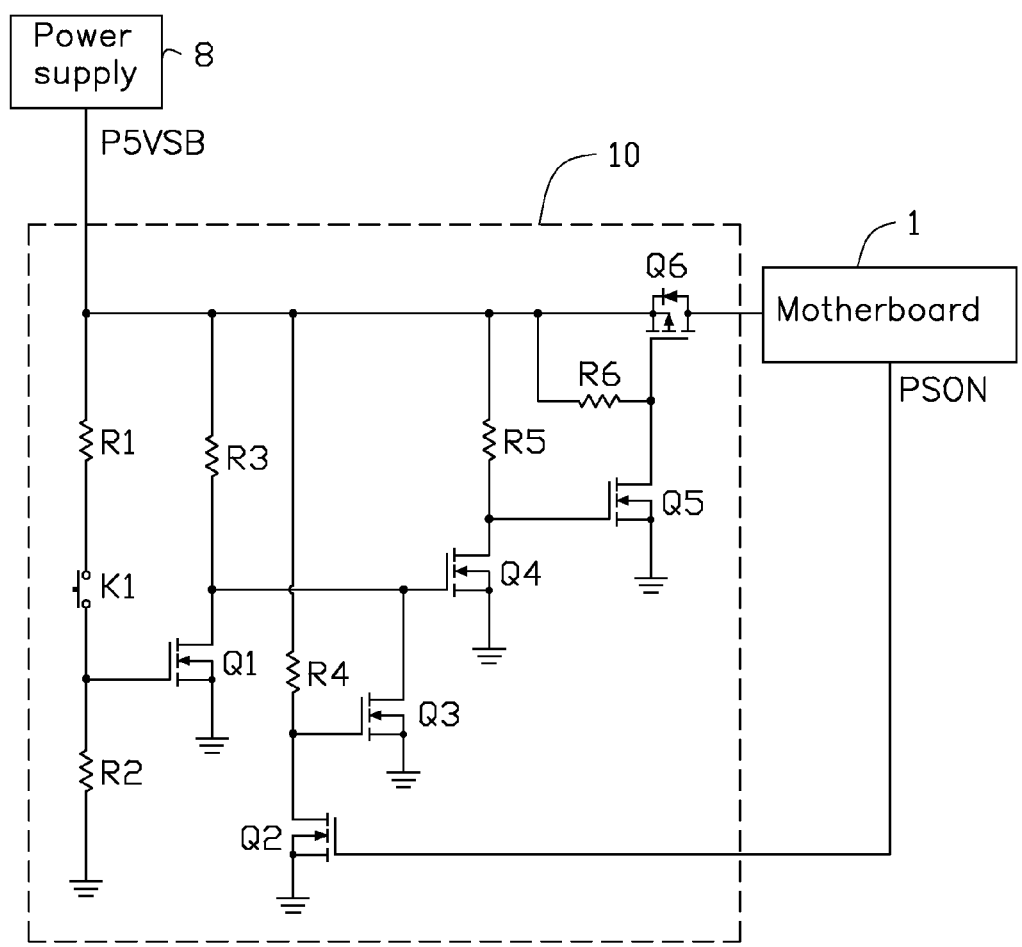

ENERGY SAVING CIRCUIT OF COMPUTER

FIELD

The present disclosure relates to an energy saving circuit of a computer.

BACKGROUND

An electronic device, such as a computer, can be turned on and off by a switch that mechanically connects and disconnects a power supply of the computer to an external power source, such as AC 110V. The power supply is connected to the external power source and transforms an external voltage into predetermined DC voltages to allow the computer to perform various programs and functions.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the presented embodiments.

The FIGURE is a circuit diagram of an embodiment of an energy saving circuit.

DETAILED DESCRIPTION

The disclosure, including the FIGURE, is illustrated by way of example and not by way of limitation. References to "an" or "one" embodiment in this disclosure are not necessarily to the same embodiment, and such references mean "at least one". Although discussion herein is directed to a computer, it will be understood the principles described can be utilized with other e-devices.

The FIGURE shows an embodiment of an energy saving circuit 10 connected between a power supply 8 and a motherboard 1 of a computer. In the embodiment, the energy saving circuit 10 comprises a switch K1, six electronic switches Q1-Q6, and six resistors R1-R6. In the embodiment, the switch K1 can be placed on a case front panel of the computer. Each of the electronic switches Q1-Q6 includes a first terminal, a second terminal, and a third terminal.

A first terminal of the switch K1 is coupled to the power supply 8 through the resistor R1 to receive a standby voltage P5VSB. A second terminal of the switch K1 is grounded through the resistor R2. The first terminal of the electronic switch Q1 is connected to the second terminal of the switch K1. The second terminal of the electronic switch Q1 is coupled to the power supply 8 through the resistor R3 to receive the standby voltage P5VSB. The third terminal of the electronic switch Q1 is grounded. The first terminal of the electronic switch Q2 is connected to the motherboard 1 to receive a power-on signal PSON from the motherboard 1. The second terminal of the electronic switch Q2 is connected to the power supply 8 through the resistor R4 to receive the standby voltage P5VSB. The third terminal of the electronic switch Q2 is grounded. The first terminal of the electronic switch Q3 is connected to the second terminal of the electronic switch Q2. The second terminal of the electronic switch Q3 is connected to the second terminal of the electronic switch Q1. The third terminal of the electronic switch Q3 is grounded. The first terminal of the electronic switch Q4 is connected to the second terminal of the electronic switch Q3. The second terminal of the electronic switch Q4 is connected to the power supply 8 through the resistor R5 to receive the standby voltage P5VSB. The third terminal of the electronic switch Q4 is grounded. The first terminal of the electronic switch Q5 is connected to the second terminal of the electronic switch Q4. The second terminal of the electronic switch Q5 is coupled to the power supply 8 through the resistor R6 to receive the standby voltage P5VSB. The third terminal of the electronic switch Q5 is grounded. The first terminal of the electronic switch Q6 is connected to the second terminal of the electronic switch Q5. The second terminal of the electronic switch Q6 is connected to the motherboard 1. The third terminal of the electronic switch Q6 is connected to the power supply 8 to receive the standby voltage P5VSB.

In at least one embodiment, when the computer is in a standby state, the power-on signal PSON output from the motherboard 1 is at a high-level, such as logic 1 (hereinafter "logic 1 PSON signal"). When the computer is in a power-on state, the power-on signal PSON output from the motherboard 1 is at a low-level, such as logic 0 (hereinafter "logic 0 PSON signal").

When the computer is in the stand-by state, the motherboard 1 outputs the logic 1 PSON signal to the electronic switch Q2 to turn on the electronic switch Q2. When the electronic switch Q2 is turned on, the electronic switch Q3 is turned off.

In the embodiment, the initial state of the switch K1 is off, and the state of the switch K1 is on when the switch K1 is pressed. When the state of the switch K1 is on, the first terminal of the electronic switch Q1 receives a high-level signal, such as logic 1 from the power supply 8, and the electronic switch Q1 is turned on. When the electronic switch Q1 is turned on, the electronic switch Q4 is turned off, the electronic switch Q5 is turned on, and the electronic switch Q6 is turned on. The motherboard 30 receives the standby voltage P5VSB from the power supply 1 through the electronic switch Q6. If the power button of the computer is pressed, the computer is turned on.

When a person wants to shut down the computer, the switch K1 is pressed again, the switch K1 is off. The first terminal of the electronic switch Q1 receives a low-level signal and is turned off, the electronic switch Q4 is turned on, the electronic switch Q5 is turned off, and the electronic switch Q6 is turned off. The motherboard 1 cannot receive the standby voltage P5VSB from the power supply 8 through the electronic switch Q6 for saving energy.

When the computer is in a power-on state, the motherboard 1 outputs the logic 0 PSON signal, the electronic switch Q2 is turned off. When the electronic switch Q2 is turned off, the electronic switch Q3 is turned on. The first terminal of the electronic switch Q4 receives a low-level signal regardless of whether the electronic switch Q1 is turned on or turned off, and the electronic switch Q4 is turned off. The electronic switch Q5 is turned on, and the electronic switch Q6 is turned on. The motherboard 1 receives the standby voltage P5VSB from the power supply 8 through the electronic switch Q6, and the motherboard 1 maintains the power on state.

In at least one embodiment, each of the electronic switches Q1-Q5 can be an n-channel field effect transistor (FET), the electronic switch Q6 can be a p-channel FET. The first terminal, the second terminal, and the third terminal of each of the electronic switches Q1-Q6 are respectively a gate, a source, and a drain of the FET, respectively. In at least one embodiment, each of the electronic switches Q1-Q5 may be an npn bipolar junction transistor (BJT), electronic switch Q6 may be an pnp BJT, and each of the electronic switches Q1-Q6 can be other switches having similar functions.

When the computer is in the stand-by state, and the switch K1 is pressed, the motherboard 1 of the computer receives the standby voltage P5VSB and the motherboard 1 maintains the stand-by state. The energy-saving circuit 10 can shut off the standby voltage P5VSB by pressing the switch K when the computer is powered off to save energy.

Even though numerous characteristics and advantages of the disclosure have been set forth in the foregoing description, together with details of the structure and function of the disclosure, the disclosure is illustrative only, and changes can be made in the details given, including the matters of shape, size, and arrangement of parts within the principles of the disclosure to the full extent indicated by the broad general meaning of the terms in which the appended claims are expressed.

What is claimed is:

1. An energy saving circuit connected between a power supply and a motherboard, the energy saving circuit comprising:
    a first resistor, a second resistor, a third resistor, a fourth resistor, a fifth resistor, and a sixth resistor;
    a switch comprising a first terminal being connected to the power supply through the first resistor to receive a standby voltage, a second terminal grounded through the second resistor;
    a first electronic switch comprising a first terminal being connected to the second terminal of the switch, a second terminal being connected to the power supply through the third resistor to receive the standby voltage, and a third terminal is grounded; wherein the second terminal of the first electronic switch is connected to the third terminal of the first electronic switch, in response to the first terminal of the first electronic switch receiving a high-level signal; the second terminal of the first electronic switch is disconnected from the third terminal of the first electronic switch, in response to the first terminal of the first electronic switch receiving a low-level signal;
    a second electronic switch comprising a first terminal being connected to the motherboard to receive a power on signal from the motherboard, a second terminal being connected to the power supply through the fourth resistor to receive the standby voltage, and a third terminal is grounded; wherein the second terminal of the second electronic switch is connected to the third terminal of the second electronic switch, in response to the first terminal of the second electronic switch receiving a high-level signal; the second terminal of the second electronic switch is disconnected from the third terminal of the second electronic switch, in response to the first terminal of the second electronic switch receiving a low-level signal;
    a third electronic switch comprising a first terminal being connected to the second terminal of the second electronic switch, a second terminal being connected to the second terminal of the first electronic switch, and a third terminal is grounded; wherein the second terminal of the third electronic switch is connected to the third terminal of the third electronic switch, in response to the first terminal of the third electronic switch receiving a high-level signal; the second terminal of the third electronic switch is disconnected from the third terminal of the third electronic switch, in response to the first terminal of the third electronic switch receiving a low-level signal;
    a fourth electronic switch comprising a first terminal being connected to the second terminal of the third electronic switch, a second terminal being connected to the power supply to receive the standby voltage through the fifth resistor, and a third terminal is ground; wherein the second terminal of the fourth electronic switch is connected to the third terminal of the fourth electronic switch, in response to the first terminal of the fourth electronic switch receiving a high-level signal; the second terminal of the fourth electronic switch is disconnected from the third terminal of the fourth electronic switch, in response to the first terminal of the fourth electronic switch receiving a low-level signal;
    a fifth electronic switch comprising a first terminal being connected to the second terminal of the fourth electronic switch, a second terminal being connected to the power supply to receive the standby voltage through the sixth resistor, and a third terminal is ground; wherein the second terminal of the fifth electronic switch is connected to the third terminal of the fifth electronic switch, in response to the first terminal of the fifth electronic switch receiving a high-level signal; the second terminal of the fifth electronic switch is disconnected from the third terminal of the fifth electronic switch, in response to the first terminal of the fifth electronic switch receiving a low-level signal; and
    a sixth electronic switch comprising a first terminal being connected to the second terminal of the fifth electronic switch, a second terminal being connected to the motherboard, and a third terminal connected to the power supply to receive the standby voltage; wherein the second terminal of the sixth electronic switch is connected to the third terminal of the sixth electronic switch, in response to the first terminal of the sixth electronic switch receiving a low-level signal; the second terminal of the sixth electronic switch is disconnected from the third terminal of the sixth electronic switch, in response to the first terminal of the sixth electronic switch receiving a high-level signal.

2. The energy saving circuit of claim 1, wherein the first electronic switch, the second electronic switch, the third electronic switch, the fourth electronic switch, and the fifth electronic switch are n-channel field effect transistors (FETs), the first, second, and third terminals of the first, second, third, fourth and fifth electronic switches correspond to gates, sources, and drains of the FETs.

3. The energy saving circuit of claim 1, wherein the sixth electronic switch is p-channel field effect transistor (FET), the first, second, and third terminals of the sixth electronic switch correspond to gate, source, and drain of the FET.

* * * * *